Mar. 27, 1923. 1,449,640
D. TURNER
CLOTH WINDING OR MEASURING MACHINE
Filed Aug. 25, 1919  9 sheets-sheet 3

Mar. 27, 1923.

D. TURNER 1,449,640

CLOTH WINDING OR MEASURING MACHINE

Filed Aug. 25, 1919

Inventor
Douglas Turner
By Elliott & Ummen
his Attorneys

Mar. 27, 1923.

D. TURNER 1,449,640

CLOTH WINDING OR MEASURING MACHINE

Filed Aug. 25, 1919   9 sheets-sheet 8

Inventor
Douglas Turner
By Elliott & Unman
his Attorneys

Patented Mar. 27, 1923.

1,449,640

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF MISSOURI.

CLOTH WINDING OR MEASURING MACHINE.

Application filed August 25, 1919. Serial No. 319,683.

*To all whom it may concern:*

Be it known that I, DOUGLAS TURNER, a citizen of the United States, residing in the city of St. Louis and State of Missouri, have invented new and useful Improvements in Cloth Winding or Measuring Machines, of which the following is a specification.

This invention relates to cloth-winding and cloth-measuring machines. The general object of the invention is to provide means for winding cloth which will operate without subjecting the cloth to high tension and which is so constructed that in passing from the supply bolt to the newly formed bolt or roll, the web of cloth will pass as nearly as possible in a direct line, that is to say, one of my objects is to avoid the necessity of employing the usual guide rollers which carry the web in a circuitous path, thereby increasing the tension; in this way I avoid placing the web under high tension, and this increases the accuracy of measurements made of the length of the web in winding the cloth. It has also been an object of the invention to provide means whereby the operator can examine the character of the texture of the cloth in the passing web when desired. The invention is very useful in winding doubled cloth, that is to say, a two-ply fabric having a creased edge, as it enables a new bolt to be formed in which the unwinding direction of the new bolt is the same as the supply bolt with respect to the location of the creased edge. This is most desirable for practical reasons. The machine is particularly useful for checking the lengths of bolts of cloth when purchased from wholesale houses, and also for measuring off predetermined quantities of cloth in bolts or rolls. One of the objects of the invention is to construct the machine so as to enable it to handle fabrics of different widths. With machines of this type, a measuring machine is frequently employed, which is driven by a measuring roller rotated by the passing cloth as it passes between the winding reels. The cloth frequently acquires considerable speed in winding, from which it follows that the measuring roller will continue to rotate after the end of the web has left it, and this of course, would produce an inaccuracy in the measurement. One of the objects of my invention is to prevent such an inaccuracy, and to provide automatic means for stopping the actuation of the measuring machine when the end of the web leaves its face. Further objects of the invention are to provide an improved organization of the winding heads, and to improve their specific construction. It has also been the general object of my invention to improve the details of the general construction of such a machine.

The invention consists in the novel features, and in the general combination of parts to be particularly described hereinafter, all of which contribute to produce a simple and efficient cloth-winding or measuring machine. A preferred embodiment of my invention will be particularly described in the following specification, while the broad scope of my invention will be pointed out in the appended claims.

In the drawing,

Figure 10 is an elevation showing the inner face of a winding head having a special construction for removably holding a winding board, certain parts being broken away;

Figure 11 is a vertical section taken on the line 11—11 of Figure 10;

Figure 12 is a side elevation and partial section showing a special form of winding reel which I may employ;

Figure 12^A is an end elevation of the special reel shown in Figure 12;

Figure 15^A is a side elevation of the special type of winding head shown in Figure 15;

Figure 17^A is a diagram illustrating an electric circuit for controlling the actuation of the measuring machine;

Figure 20 is a side elevation and partial section illustrating a detail of the driving head; and Figure 20^A is an end elevation of the parts shown in Figure 20.

In carrying out my invention, I provide an under frame 1 which supports the machine at a convenient height above the floor, and the opposite ends of this frame are provided with drop leaves 2 (Fig. 9) which can be held up in a horizontal position so as to operate as convenient landing shelves or tables, useful in handling the bolts or rolls of cloth. The frame proper of the machine includes two oppositely disposed side frames 3 and 4, the latter of which supports most of the mechanism of the machine, (see Figs. 4 and 9). These side frames are connected rigidly together by horizontal frame bars designated generally by the number 6.

The winding mechanism includes a receiving reel 7, (see Fig. 4), which comprises a winding head or receiving head 8 carried by the side frame 4, and an adjustable receiving head 9 which is carried in the side frame 3. This receiving head 9 is in axial alinement with the co-operating head 8, and is made adjustable by attaching it to a shaft or stem 10 mounted to slide through a bearing 11 attached on the side frame 3.

On the opposite side of the machine there is mounted a supply reel 12 which consists of a supply winding head 13 rotatably mounted on the side frame 4, and a winding head 14 alining with it and supported near the side frame 3. This winding head 14 is adjustable toward or from the head 13. For this purpose, it is mounted upon a shaft mounted rotatably in a long bearing 15 the support for which will be described more in detail hereinafter.

I provide means for driving the receiving heads 8 and 9 in synchrony with each other and means for driving the winding heads 13 and 14 in synchrony with each other. I also provide differential means for driving the reels, that is to say, the reel composed of the pair of heads 8 and 9 is driven differentially with the reel composed of the pair of heads 13 and 14. The effect of the differential driving mechanism is to impart differential rotation to both reels, that is to say, I do not only drive the reel that the cloth is winding upon, but I also drive the reel that the cloth is winding from. In this way I avoid subjecting the web of cloth to undesirable tension in passing between the reels, which stretches the cloth and causes inaccuracy in measuring it. Furthermore, I provide a slip-connection in the drive to the supply reel, which operates in such a way that if the supply bolt of cloth is mounted in this reel in the wrong position, that is to say, in such a position that when it is rotated it will tend to wind up the cloth instead of winding it off, then this slip connection will slip and thereby avoid placing high tension on the web of cloth; this slip connection also prevents injury to the mechanism.

I shall now describe the means which I prefer to employ for accomplishing these effects, at the same time, describing the means for driving the co-operating winding heads in synchrony with each other.

The reels may be driven by an electric motor 16, (see Fig. 4), which is attached to the side frame 4, and by means of a worm 17 (Fig. 9) on the shaft of this motor, it drives the worm wheel 18 loose on the shaft 19, but rigid with a sprocket wheel 20, the sprocket chain 21 of which drives a sprocket wheel 22 carried rigidly by the differential shaft 23. The differential shaft carries a spider 24 with radially disposed pinions 25 which operate to drive two bevel gears 26 and 27, the former of which carries rigidly a gear wheel 28 meshing with a gear wheel 29^a which is attached to a spindle or shaft 29 that carries the aforesaid winding head 8. The bevel gear 27 is rigid with the sleeve 30, carrying a bevel gear 31 which drives a bevel gear 32 carried by a shaft 33, including an outer section 33^a which is provided with a bevel gear 34 for driving a bevel gear 36 carried on the end of the shaft or spindle 37 of the aforesaid winding head 13. In this way, the two winding heads 8 and 13 are driven differentially.

I shall now describe how the winding head 8 drives its co-operating winding head 9 in synchrony with itself.

For this purpose, the winding head 8 is provided with a sprocket wheel 38 (see Fig. 4), which drives a sprocket chain 39 passing over a sprocket wheel 40 which is rigidly attached to the shaft 19, and the outer end of the shaft 19 carries a sprocket wheel 41 through the movement of which a sprocket chain 42 is driven. This chain 42 passes around a sprocket wheel 43 which is splined on the shaft 10 of the adjustable winding head 9. It should be understood that the diameters of the sprocket wheels 38, 40, 41 and 43 are such that the head 9 will be driven at the same speed and in synchrony with the head 8.

I shall now describe the means for driving the head 13 in synchrony with the head 14.

For this purpose, the spindle or shaft of the head 13 carries a sprocket wheel 44, over which passes a sprocket chain 45 which drives a sprocket wheel 46 on a shaft 47 extending between the frames 3 and 4, and this shaft 47 carries a sprocket wheel 48 driving a sprocket chain 49 which in turn drives a sprocket wheel 50 connected with the head 14.

The shaft 10 of the winding head 9 carries a knob 51 (see Fig. 3) which enables the head to be adjusted in or out.

Figure 3:
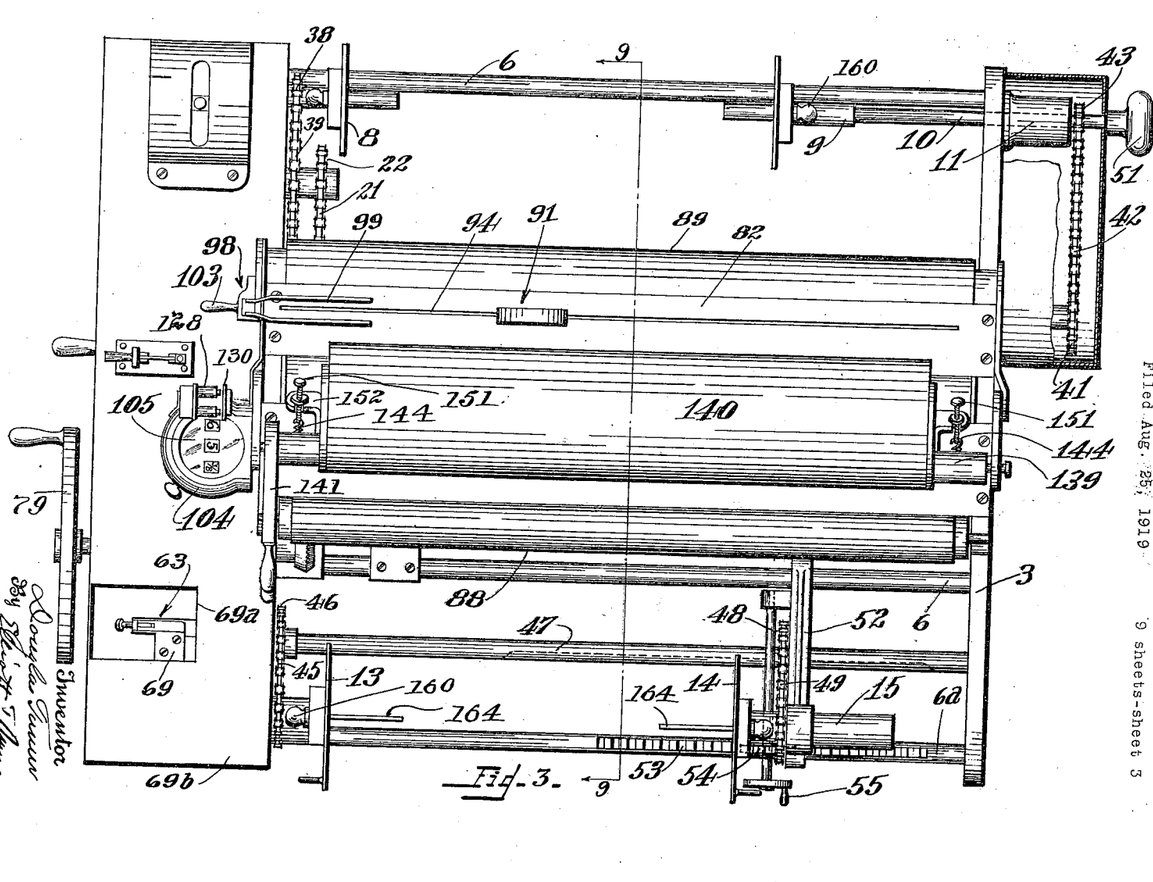
Figure 3 is a plan of the machine, certain parts being broken away.

I shall now describe the means for adjusting the winding head 14 toward or from its co-operating head 13, referring especially to Figure 3. The bearing 15 is carried on a sliding frame 52 which is mounted to slide on one of the aforesaid horizontal rods 6 and it also slides on a special horizontal rod 6$^a$, the upper face of which is formed into a rack 53, and on the side of the bearing 15, a small pinion 54 is mounted so as to be rotatable by a small handle 55. When this handle is rotated the pinion will drive the sliding frame 52 along the guide rods 6 and 6$^a$. In this connection, it should be understood that the sprocket wheel 48 is splined on the shaft 47 and carried by the adjustable sliding frame 52 so that it moves along with the sliding frame.

Figure 4:
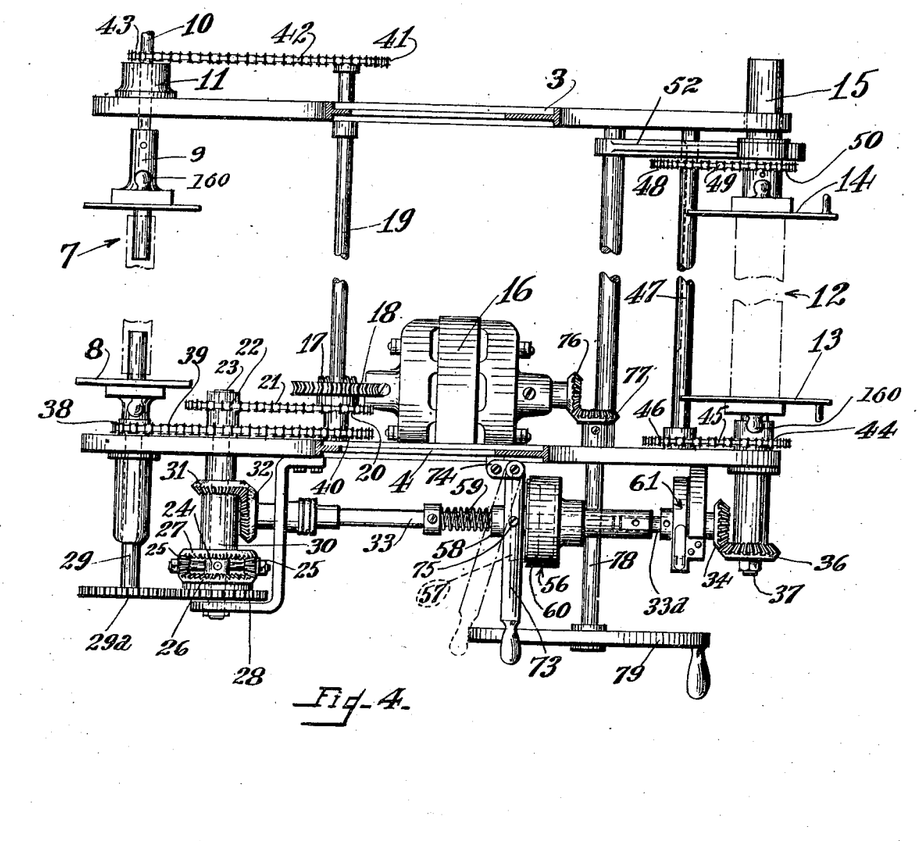
Figure 4 is a horizontal section through the frame of the machine, and particularly illustrating the means for driving the winding heads.

The shaft 33 (Fig. 4) carries a slip-connection or slip-drive for driving the supply reel 12. This slip-connection is preferably in the form of a clutch 56 including a conical clutch member 57 attached to a sliding collar 58 which is pressed by coil-spring 59 so that it tends to hold the clutch member 57 in engagement with the driven clutch member 60, the latter clutch member being carried by the shaft 33$^a$ which carries the bevel gear 34 referred to above. The shaft 33$^a$ is provided with a tension device which enables a suitable resistance to be offered in driving the supply reel 12, the effect of which is that the web of cloth will be subjected to just the right amount of tension in winding it off of the supply reel 12. This tension device 61 is illustrated in Figure 4, but is shown in detail in Figure 19; it simply consists of a disk or brake-wheel 62, carried on the shaft 33$^a$ and provided with a brake-band 63, one end of which is fixed at 64 and the other end 68 of which has a slidable connection on a stem 65, the upper end of which pivotally carries a cam-lever 66. This cam-lever has a projecting toe or cam 67. Evidently by rotating the cam-lever 66 toward the left, the toe 67 can be brought into contact with the end 64, of the brake-band and this will tighten the band on the wheel 62. Figure 3 shows how this brake-band 63 is attached to a fixed bracket 69, accessible through an opening 69$^a$ in a gear case 69$^b$. The stem 65 is provided with threads 70 at its lower end to receive a threaded adjusting sleeve 71 having a knurled head 72 which can be rotated to adjust the tension of the brake-band 63. A coil spring 72$^a$ is interposed between the end of the sleeve 71 and brake-band 68 in order to provide a yielding pressure on the brake-band and equalize the pressure exerted by the sleeve 71. This keeps the brake-band from ever binding tight on the wheel 61.

Although the slip-connection or clutch 56 does not necessarily include means for opening the clutch, I prefer to provide a lever 73 for this purpose, which is pivoted at its inner end to a floating link 74 and connected by a screw 75 to the side of a hub or collar 58 which is carried by the movable clutch member 57. In order to enable the winding heads to be driven by hand when desired, the shaft of the motor 16 carries a bevel gear 76 (see Fig. 4), which can be driven by a similar bevel gear 77 carried on the end of a shaft 78 having a hand wheel 79 for rotating it at will.

Figure 2:
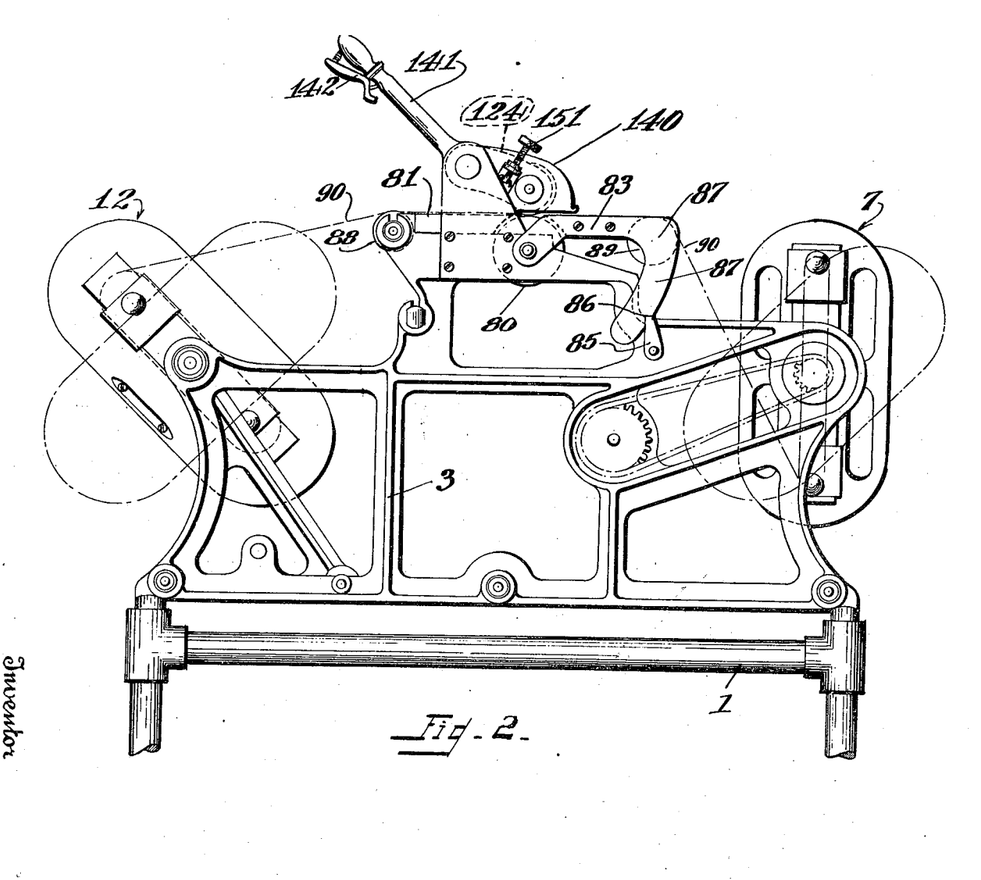
Figure 2 is a side elevation showing the rear side of the machine, that is to say, the side opposite to the position of the operator of the machine.
Figures 8, 9:
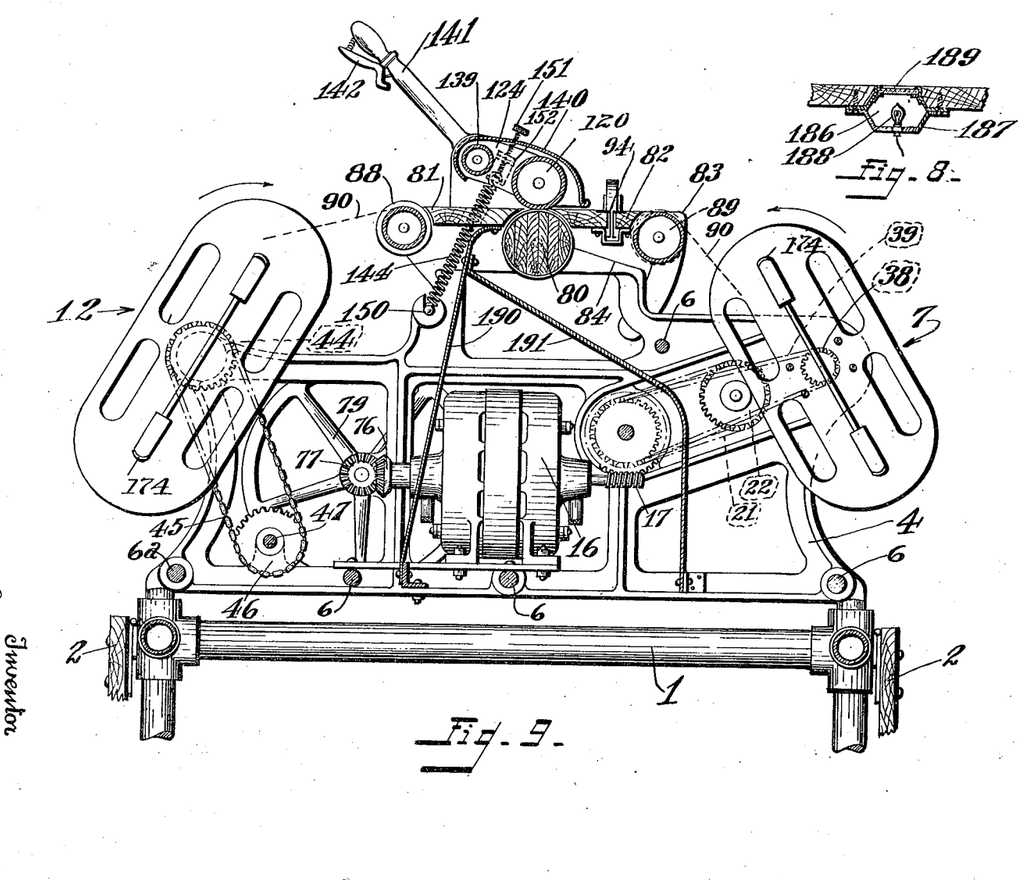
Figure 8 is a vertical section showing the details of means for enabling the texture of the web to be examined during the winding operation.
Figure 9 is a vertical cross-section through the machine.

Referring especially to Figure 9, between the reels 7 and 12 and rotatably supported in the side frames 3 and 4, I provide a measuring roller 80, the upper face of which is countersunk into a table which includes a fixed leaf 81 and an adjustable leaf 82. This adjustable leaf 82 is attached between two arms 83 (Fig. 2) which are pivotally attached on the axis of the trunnions of the measuring roller 80. This table may be held in an elevated position as in Figure 9, or it may be dropped down into an inclined position at which time it will be supported on inclined edges 84 of the side frames 3 and 4. This leaf may be held in its elevated position by means of pawls 85 (see Fig 2) which engage notches 86 in quadrants 87 formed respectively on the arms 83. At the opposite edges of the table composed of the leaves 81 and 82, I provide guide rollers 88 and 89 over which the web 90 passes in winding from one reel to the other. The direction of rotation of the reels is indicated in Figure 9.

When the leaf 82 is held in its inclined position the arc of contact of the cloth with the measuring roller is increased which tends to give greater accuracy in measurement.

Figure 1:
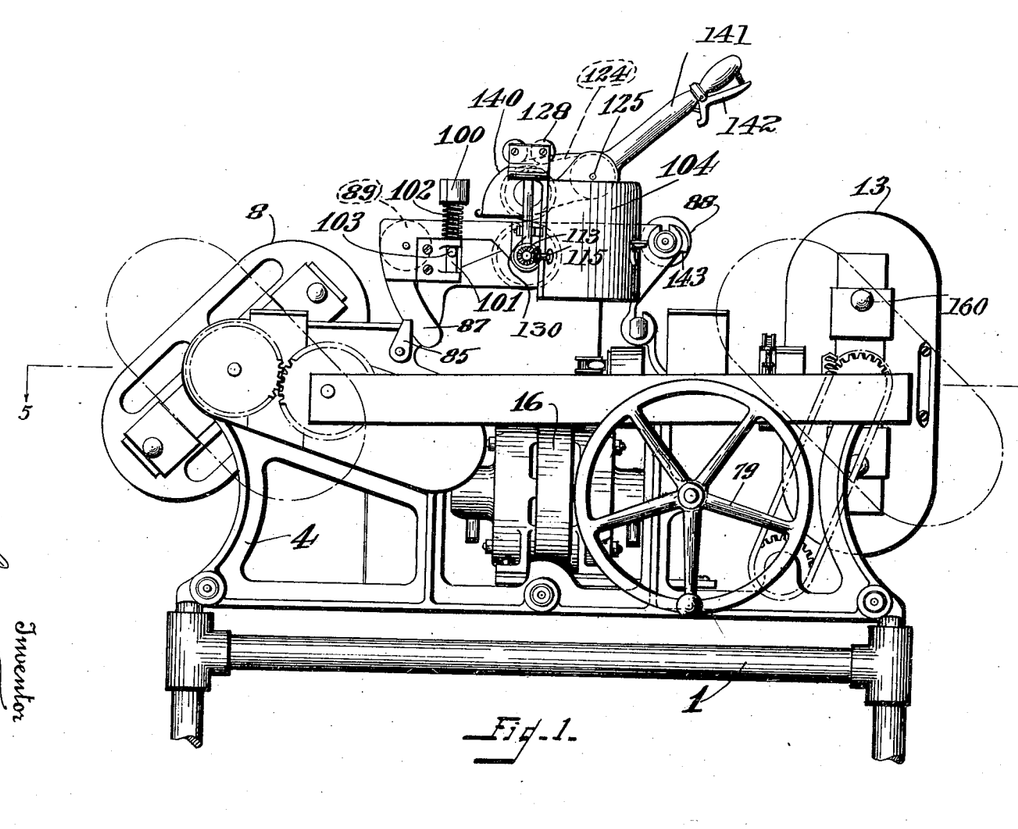
Figure 1 is a side elevation of the machine embodying my invention, the under frame being broken away.
Figure 13:
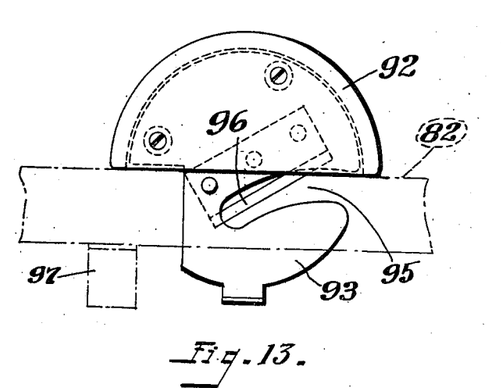
Figure 13 is a side elevation of a cutter for severing the measured piece of cloth from the supply bolt.
Figure 14:
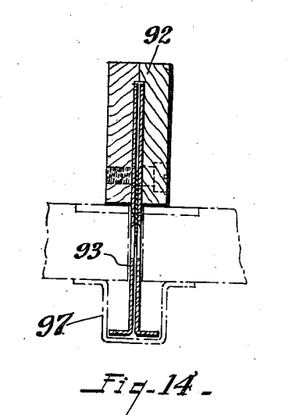
Figure 14 is a vertical cross-section taken through the parts shown in Figure 13.

The leaf 82 is provided with a cutting device 91 (see Figs. 3, 9, 13 and 14); this cutter includes a semi-circular slide block 92 (see Fig. 13) which carries two guide plates 93 which extend down through a slot 94 which extends longitudinally in the leaf 82 (see Fig. 3). These guide plates 93 are cut on their forward edges so as to provide a guide throat 95 for guiding the edge of the cloth into a position to be cut by the edge of a knife 96 which is clamped in an inclined position in the block. In order to increase the rigidity of the table leaf 82 at the slot, I provide U shaped brackets 97 for straddling the slot (see Figs. 9 and 14). When the cloth is to be cut, one edge of the web may be clamped on the face of the leaf by means of a suitable clamping device 98 including two horizontal clamping fingers 99 which hold the cloth against the table on opposite sides of the slot (see Fig. 3). These fingers are attached to a depressible head 100 (see Fig. 1) which is attached to the upper end of a stem 101, and are normally held elevated by a coil-spring 102. The stem 101 carries a laterally projecting handle 103 by means of which the clamping device may be operated.

I shall now describe the manner of driving the indicating mechanism of a measuring machine 104, (see Fig. 3). The indicating mechanism presents numbers on a dial 105, which indicate the length or amount of the web which has passed the measuring roller; and I shall also describe the automatic means which I provide for stopping the movement of the indicating mechanism when the end of the web passes the measuring roller. This feature of the machine is very important, because if the measuring roller "spins" or continues to rotate, after the end of the web leaves it, the measuring machine will indicate a greater length of cloth than was actually carried by the bolt.

Figures 17, 18:
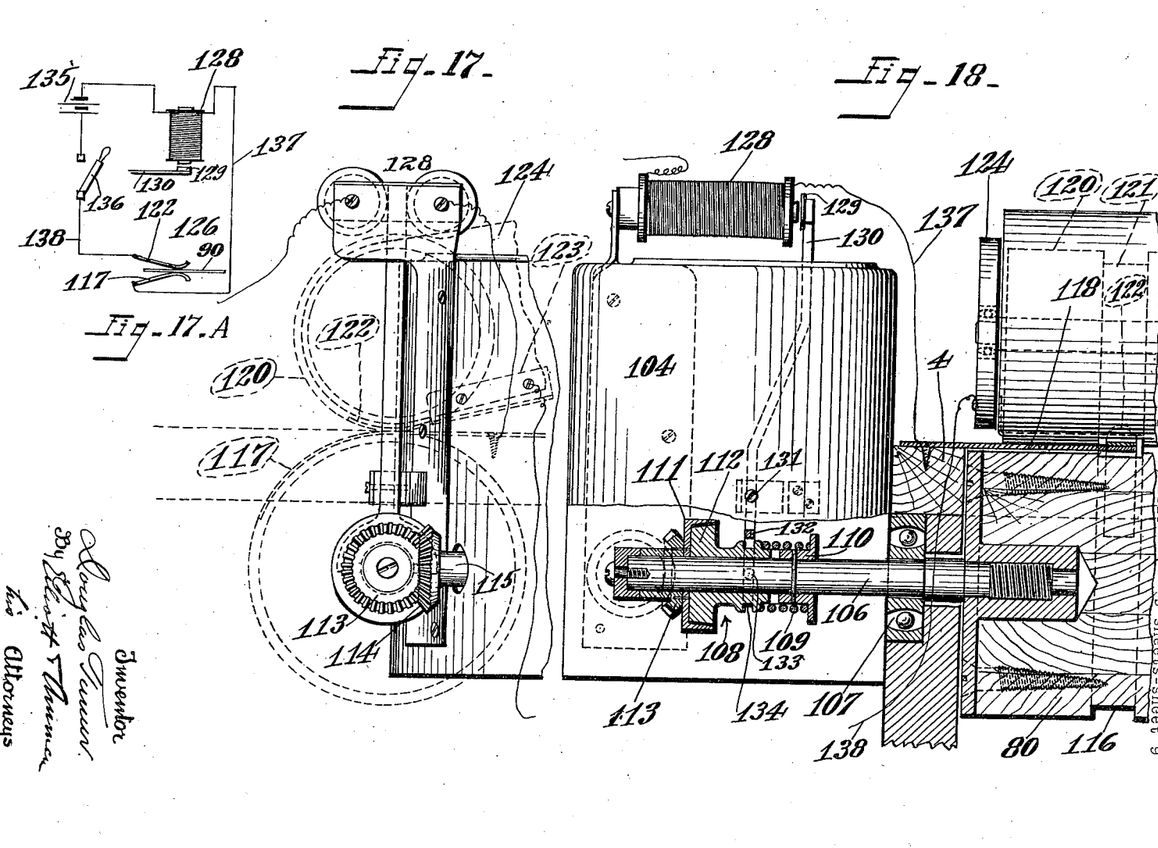
Figure 17 is a detail side elevation illustrating part of the means for automatically stopping the actuation of the measuring machine when the end of the web leaves the measuring roller.
Figure 18 is a cross-section through the end of the measuring roller taken in a plane at right angles to the plane of Figure 17, certain parts being shown in elevation.

Referring now especially to Figures 3, 17 and 18, the shaft or trunnion 106 of the measuring roller 80 is mounted in a suitable ball-bearing 107 beyond which the shaft is provided with a clutch 108 which is normally held closed by a coil-spring 109 thrusting against a fixed collar 110 on the shaft 106; the clutch 108 includes a relatively fixed clutch member 111 and a sliding clutch member 112 against which the spring 109 thrusts. Beyond the clutch member 111, the shaft 106 carries a loose bevel gear 113 which meshes with a driven bevel gear 114 carried on a shaft 115 which extends into the interior of the measuring machine 104 in order to drive the indicating mechanism. The clutch member 112 is splined on the shaft 106 and is driven by the measuring roller 80 when it rotates. When the clutch member 112 is engaging the clutch member 111 the movement of the measuring roller is imparted to the indicating mechanism.

I prefer to provide electrical means for opening this clutch automatically when the end of the web leaves the measuring roller, in measuring the length of a bolt.

I shall now describe the means I employ for this purpose.

The measuring roller 80 is provided with a circumferential groove 116 (Fig. 18) in which lies an arcuate metallic contact strip 117 (Fig. 17) which is carried by a metallic tongue 118, connected to the conductor 137 leading to the electromagnet 128 (see Fig. 18). Above the measuring roller there is mounted a presser roller 120 which is also provided with a circumferential groove 121, similar to and opposite the groove 116, and into this groove 121 an arcuate metal contact 122 projects, the same being attached by a clip 123 to a metallic arm 124 which is disposed at one end of the presser roller. There are two of these arms 124 that support the presser roller between them and they are pivotally mounted at 125, (see Fig. 1). I provide an electric circuit 126 (see Figure 17A), which connects up these contacts 117 and 122. These contacts are springs tending to come together, and when they are in engagement with each other, the circuit is closed; however, when the machine is measuring cloth, the web 90 of the fabric is disposed between the contacts and holds them apart. The controlling circuit 126 includes an electromagnet 128 which is mounted near the upper side of the measuring machine 104, and in a position to attract an armature 129 attached to the upper end of a lever 130, which lever is pivoted at 131, (Fig. 18) the lower end of which is formed into a yoke 132 carrying pins 133 which engage in the groove 134 in a collar formed on the movable clutch member 112. This circuit 126 includes a suitable source of E. M. F., such as a battery 135, and at a suitable point on the winding machine a switch 136 is provided which should be closed when the machine is in operation. A conductor 137 connects the electro-magnet with the contact 117, while another conductor 138 connects with the upper contact 122.

It is evident that as soon as the end of the web leaves the vicinity of the measuring roller, the contacts 117 and 122 will come together by reason of their resiliency, and this will close the circuit and open the clutch 108, thereby stopping the driving of the indicating mechanism.

The arms 124 are connected by a transverse tubular rock shaft 139 (Fig. 9) and are also covered by a rigid hood 140 which envelops them and extends over the presser-roller. When it is desired to raise the presser roller off the measuring roller, this is accomplished by means of a lever 141 which is connected with the tubular rock shaft 139. This lever is provided with a hand-operated catch 142, the latch of which can be engaged under a lug or shoulder 143 at an elevated point on the frame (see Fig. 1); when in this position the presser-roller will be held elevated above the measuring roller. I do not desire that the presser roller should be pressed with great force against the measuring roller. In fact, I prefer that it should press very lightly upon the measuring roller. However, in order to produce a slight and adjustable pressure, I provide a coil-spring 144 at each side of the machine, (see Fig. 9). These springs are anchored at 150 at their lower ends, and their upper ends are attached to adjustable screws 151 received in suitable brackets 152.

Figures 15, 16, 19:
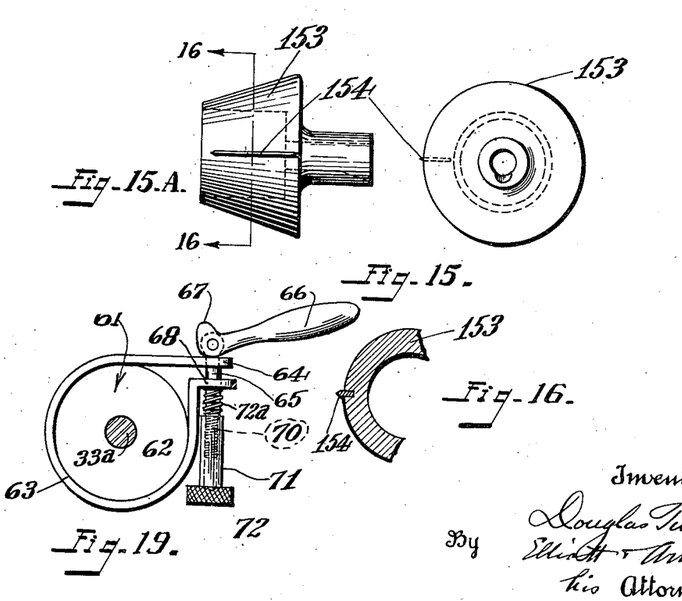
Figure 15 is a plan of a special form of winding head which I may employ for winding the cloth onto a tube.
Figure 16 is a cross-section taken on the line 16—16 of Figure 15^A, partially broken away.
Figure 19 is a view illustrating the details of a tension device.

I may employ this machine for winding cloth onto tubes. For this reason, I provide with the machine, a special head of the type illustrated in Figure 15^A. This head has a conical body 153, the small end of which is adapted to be received within the end of the tube, and the side of this conical head is provided with means such as an inset blade 154 which engages the wall of the tube and prevents any relative rotation or slip between the head and the tube when the web is being wound on or off of the tube. The driving heads which are illustrated on the machine, are, of course, removable and interchangeable so as to permit the heads such as a head 153 to be employed on one or both reels, if desired.

In this connection, it should be understood that it is most advantageous to wrap delicate silks and similar goods in roll form about a tube instead of in a bolt because there is less tendency for the fabric to become creased.

Figures 5, 7:
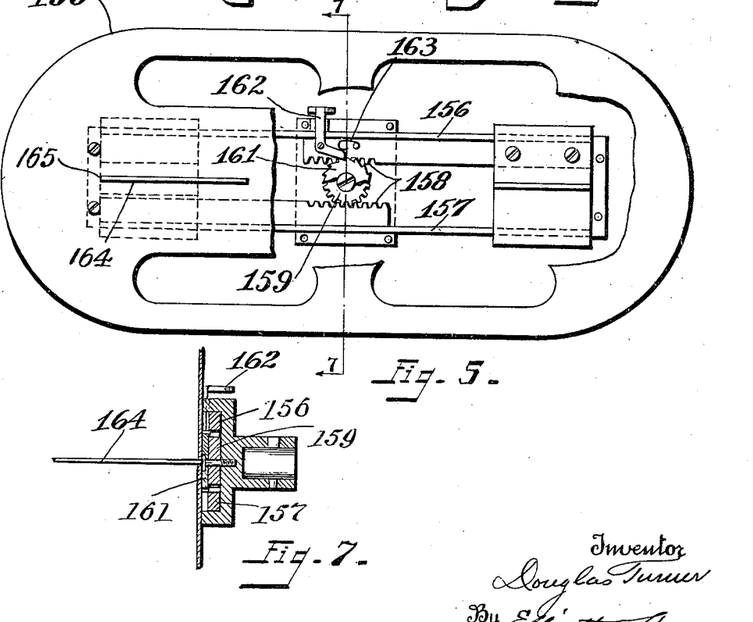
Figure 5 is an end elevation showing the inner face of one of the winding heads, certain parts of this view being broken away.
Figure 7 is a cross-section through the winding head shown in Figure 5, taken on the line 7—7 of Figure 5.
Figure 6:
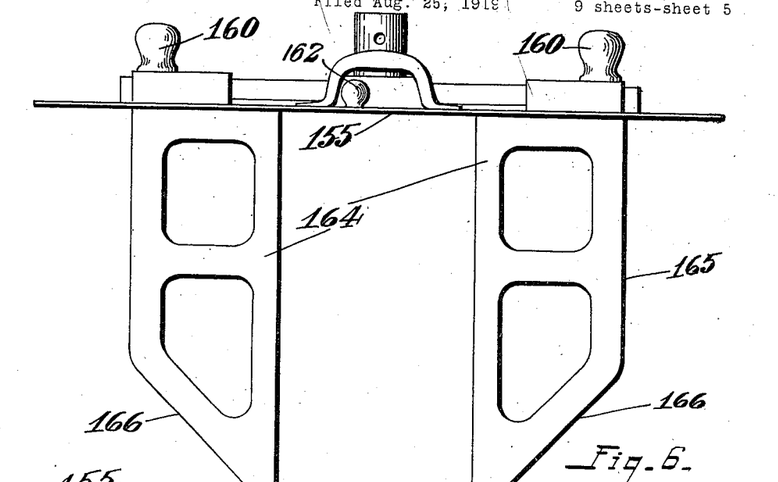
Figure 6 is a plan of the winding head shown in Figure 5.

A preferred form of the winding head for holding the supply bolt, is illustrated in Figures 5 and 6; each head consists of an oblong or oval plate 155 carrying and guiding slides 156 and 157, each slide including a rack 158. These racks respectively mesh upon opposite sides of a pinion 159 disposed on the axis of rotation of the head. The slides are provided respectively with knobs or handles 160 by means of which the slides can be pulled out to a desired adjusted position. The pinion 159 is rigid with a small ratchet wheel 161 with which a pawl 162 co-operates enabling the pinion to be locked against rotation in the direction which would permit the slides to move inwardly. The pawl 162 is held in mesh with the teeth of the ratchet by means of a small spring 163. Each slide carries a plate or blade 164 disposed parallel with the axis of rotation of the head, and these plates or blades lie in the same plane with each other so that they are in the proper relation to be received in the ends of a bolt of cloth. In order to facilitate the use of this head for this purpose, I prefer to taper the inner ends of the blades, that is to say, I provide them with inclined side edges 166. This gives the blades a form which facilitates their being inserted in the end of a bolt.

Figures 10, 11, 12, 12A, 20, 20A:
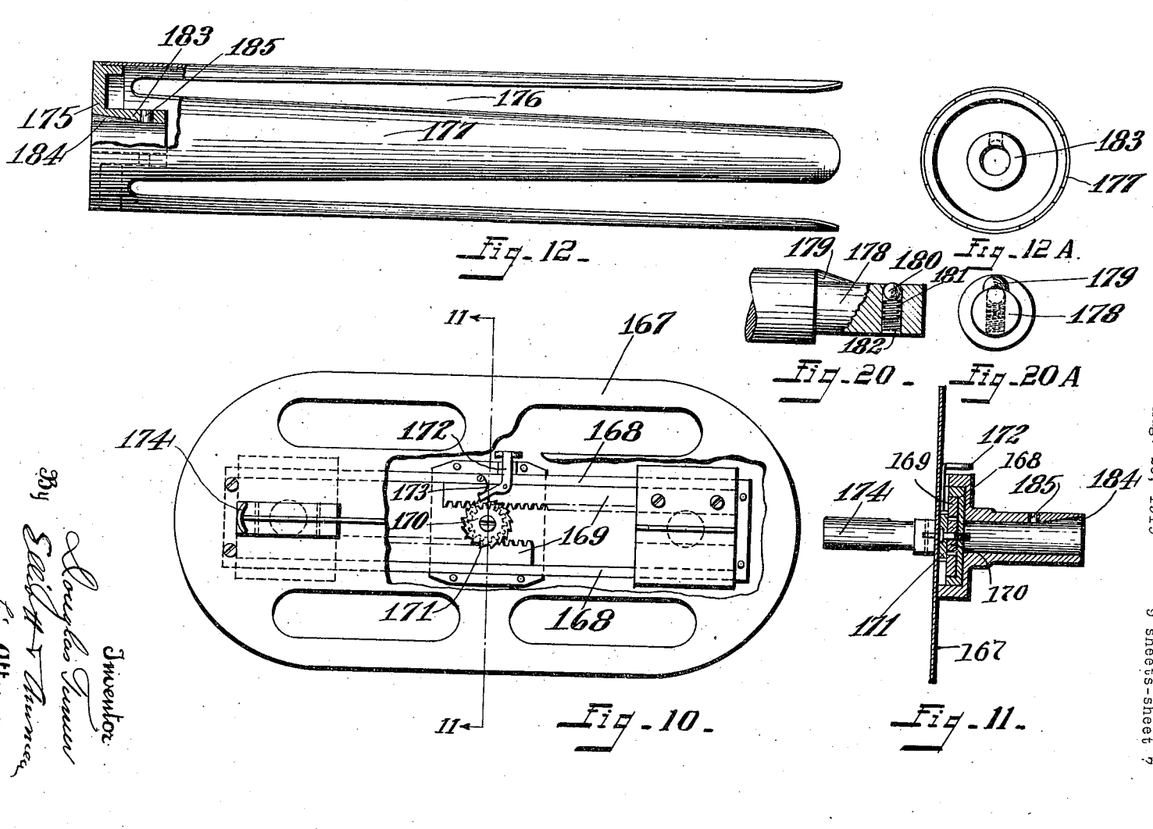

I provide another type of head somewhat similar to this, but adapted to be used for holding a board about which the cloth is to be wound. This type of head is illustrated in Figure 10. It comprises an oval plate 167 which operates as a carrier and guide for two slides 168 carrying racks 169 meshing with a central pinion 170. Rigid with this pinion 170 I provide a small ratchet wheel 171, and a co-operating pawl 172 which locks the slides against being pulled outwardly. The pawl is actuated by a spring 173. Each slide carries a resilient holder 174. Each holder consists simply of a leaf spring which is slightly concave transversely and which projects substantially at right angles to the plane of the oval plate 167 (see Fig. 10). Where these holders join their slides the concave form is absent and a flat form at this point gives increased resiliency. In holding the board its edges are held in the concave portions of the holders or clips 174.

Instead of employing heads of the types described above, I may provide a reel such as illustrated in Figure 12, which is supported at one end only. This reel consists of a head 175 to which a tubular body is attached, the said tubular body being cut with broad longitudinal slots 176 so that it forms a plurality of resilient fingers 177 about which the cloth may be wrapped.

Figure 20 shows the preferred construction of the shaft of one of the winding heads. Each of these shafts has a reduced neck 178 with a tapered key 179 near its root, and also carries internally a ball 180 which slightly projects through the side wall of the neck, being forced outward by a spring 181 held in place by a small countersunk screw 182.

The head 175, already described, is provided with a hub 183 having a groove 184 at one side, to receive the key 179 which insures that the reel will not slip on the shaft. And the hub 183 is also provided with a small opening 185 which receives the ball 180 and in this way the ball tends to prevent the reel from being pulled off of the end of the shaft.

I shall now describe the means which I provide for indicating the texture of the fabric to the operator of the machine as the cloth passes between the reels. For this purpose I provide a source of illumination on the side of the web which is remote from the operator's position, so that the operator may observe the light through the fabric, and in this way may note the character or texture of the cloth. In this way he may note any imperfections in the cloth.

In order to accomplish this result, I provide the fixed table leaf 81 with a longitudinal slot or window 186 (Fig. 8) beneath which I provide a trough 187 carrying electric lights 188. Flush with the upper surface of the table leaf I provide a plate 189 of translucent or transparent material such as frosted glass. In this way the slot 186 operates as a window through which the light passes upwardly, enabling the texture of the fabric to be scrutinized as it passes.

I prefer to inclose the motor in a housing comprising two plates 190 and 191 (see Fig. 9). This housing extends up from a point right under the measuring roller and operates as a screen to prevent the oil from the machinery from being thrown up against the cloth.

The operation of the complete machine will now be briefly stated.

A bolt or roll of cloth is mounted on the supply reel 12, and the loose end of the fabric is pulled across the upper face of the guide roller 88, and then over the top of the table and between the presser roller and the measuring roller 80; this operation is continued until the edge of the cloth is in alinement with the cutting slot 94 (Fig. 9). The indicating mechanism is then turned back to zero and the presser roller is let down onto the face of the measuring roller. The end of the cloth is then pulled across the guide roller 89 and wound around the receiving reel 7. The direction of rotation of the reels is indicated in Figure 9, and hence the web 90 of the cloth will come off of the upper side of the supply reel and pass onto the under side of the receiving reel. This direction of rotation is desirable for the reason explained above, namely, that in winding two-ply material having a creased edge, the roll or bolt which is being formed will have the same direction of wrap as the supply bolt with respect to the creased edge.

This direction of rotation is also advantageous by reason of the fact that the upper sides of the reels move toward the table, for the reason that with this direction of rotation, the reels constantly hold the fabric down against the adjacent roller of the table and incidentally enable the height of the roller above the reels, to be reduced. This reduces the head room necessary for the machine, and is a desirable improvement.

If the cloth is to be wound upon a board, the board is put in place between the holders 174, (see Figs. 9 and 10).

As the cloth passes over the table leaf 81, the operator of the machine observes the quality of the cloth as revealed by the light passing up through the window 186.

In pulling the web 90 across the table, the web passes between the contacts 117 and 122 and holds the circuit 126 open, which permits the spring 109, (see Figs. 17<sup>A</sup> and 18) to hold the clutch 108 closed. Hence, as the web is pulled past the measuring roller, the measuring roller drives the indicating mechanism of the measuring machine 104, and this driving movement occurs until the end of the web passes from between the contacts. When the winding machine is being used to measure the length of cloth contained in an entire supply bolt, when the winding is nearly completed, the end of the cloth leaves the contacts and measuring roller; as this occurs the contacts come together and close the circuit 126 which excites the electro-magnet 128, and this opens the clutch. The driving of the indicating mechanism of the measuring machine instantly stops.

Although the machine is intended primarily for measuring the length of cloth in a complete bolt, it may be used to measure any desired length, in which case the switch of the motor circuit should be opened so that the motor stops a little short of the amount required and the machine is then advanced by rotating the hand wheel 79 to the exact measurement required.

It is understood that the embodiment of the invention described herein, is only one of the many embodiments my invention may take, and I do not wish to be limited in the practice of my invention, nor in my claims, to the particular embodiment set forth.

What I claim and desire to secure by Letters Patent is:

1. In a cloth winding machine, the combination of a pair of winding heads mounted to rotate on alined axes, a second pair of winding heads mounted to rotate on alined axes, means for supporting a bolt or roll between each pair of heads, and means for driving the heads of each pair in synchrony with each other, and differential mechanism for driving both pairs of heads.

2. In a cloth winding machine, the combination of two pairs of axially alined winding heads, means for driving the winding heads of each pair in synchrony with each other, differential mechanism for driving both pairs of winding heads, and a slip connection through which one of the said pairs of winding heads is driven.

3. In a cloth winding machine, the combination of a frame, a supply reel for supporting the bolt of cloth from which the cloth is being unwound, a receiving reel for supporting a bolt of cloth upon which the cloth is being wound, differential mechanism for driving both reels, and a friction clutch through which the differential mechanism drives one of said reels, said friction clutch constructed so as to slip if the web of cloth between the pairs of heads has been accidentally applied so as to wind onto both reels and thereby subject the web to dangerous tension.

4. In a cloth winding machine, the combination of a delivery reel, a receiving reel, differential mechanism for driving the reels, including a slip connection through which the differential mechanism drives the supply reel and a tension device associated with the supply reel for subjecting the cloth to tension in passing from the supply reel.

5. In a cloth winding machine, the combination of a frame having oppositely disposed end frames, a pair of winding heads comprising a supply winding head rotatably mounted in one of the end frames, and a second supply winding head rotatably mounted on the opposite end frame in axial alinement therewith, means for driving both of said heads in synchrony, a second pair of heads comprising a receiving head rotatably mounted in one of the end frames, and a co-operating receiving head in axial alinement therewith and rotatably supported in the other end frame, means for effecting the adjustment of corresponding heads of said pairs toward and from their opposite winding heads, means for driving the winding heads of each pair in synchrony with each other, differential mechanism for driving the pair of receiving heads and the pair of supply heads, and a slip-driving connection between the differential mechanism and the supply heads.

6. In a cloth winding machine, the combination of a frame, a supply reel and a receiving reel rotatably mounted on the frame, a roller between the reels and over which the cloth moves in passing between the reels, a table for guiding the cloth adjacent to the roller and including a leaf adjustably mounted on the axis of the roller, and a guide roller carried on the adjustable leaf and operating to guide the cloth off of the face of the first named roller.

7. In a cloth winding machine, the combination of a supply reel and a receiving reel, differential mechanism for driving both of the reels, a shaft carrying a brake-wheel through which the differential mechanism drives the supply reel, a brake disposed around said brake wheel for producing tension in the cloth drawn from the supply reel, means engaging one end of the brake band for tightening the same on the brake wheel, and a spring for yieldingly engaging the other end of the brake band.

In testimony whereof, I have hereunto set my hand.

DOUGLAS TURNER.